United States Patent
Cole

(10) Patent No.: US 6,198,515 B1
(45) Date of Patent: Mar. 6, 2001

(54) APPARATUS AND METHOD FOR CONTROLLED SEALING BETWEEN BEZEL AND CRT

(76) Inventor: Joseph W. Cole, 10228 Angel Peak Ct., Las Vegas, NV (US) 89134

( * ) Notice: Subject to any disclaimer, the term of this patent is extended or adjusted under 35 U.S.C. 154(b) by 0 days.

(21) Appl. No.: 09/039,551

(22) Filed: Mar. 16, 1998

(51) Int. Cl.[7] ......................................................... H04N 5/64
(52) U.S. Cl. ............................ 348/836; 348/827; 312/7.2
(58) Field of Search ..................................... 348/825, 826, 348/827, 836, 839, 841; 312/223.3, 7.2

(56) References Cited

U.S. PATENT DOCUMENTS

| | | | |
|---|---|---|---|
| 2,528,973 | * | 11/1950 | Radman ................................. 348/825 |
| 2,604,536 | * | 7/1952 | Rose ...................................... 348/827 |
| 2,733,434 | * | 1/1956 | Leonard et al. ....................... 348/825 |
| 2,738,501 | * | 3/1956 | Swanson ............................... 348/825 |
| 2,757,889 | * | 8/1956 | Cady ................................. 345/825 X |
| 2,852,768 | * | 9/1958 | Wielenga .............................. 348/826 |
| 3,321,577 | * | 5/1967 | Burke et al. ......................... 345/825 |
| 4,675,569 | * | 6/1987 | Browman et al. . |
| 4,769,634 | * | 9/1988 | Killian, Jr. et al. ............. 348/827 X |
| 4,827,439 | * | 5/1989 | Licht ................................. 312/7.2 X |
| 5,084,757 | * | 1/1992 | Leo et al. ............................. 348/825 |
| 5,642,922 | * | 7/1997 | Ramachandran et al. .... 312/223.3 X |
| 5,951,397 | * | 9/1999 | Dickinson . |

* cited by examiner

*Primary Examiner*—Janet M. Wilkens
(74) *Attorney, Agent, or Firm*—Michael McEntee; Law Office of Michael McEntee

(57) ABSTRACT

An improved cathode ray tube ("CRT") positioning apparatus and method for use in a video display terminal. In particular, it solves the problem of precisely locating each of the four corners of the CRT at a predetermined distance from the inner edges of the bezel, such that a predetermined sealing pressure is achieved between the bezel and the CRT.

2 Claims, 5 Drawing Sheets

APPARATUS AND METHOD FOR CONTROLLED SEALING BETWEEN BEZEL AND CRT

BACKGROUND OF THE INVENTION

This invention converts an inexact, cut and try approach for closing the gaps between a Cathode Ray Tube ("CRT") and a bezel, into a precise, predetermined methodology. All four corners of a rectangular CRT are closed with precision, simultaneously, and without the need for shims. Equally important, the pressure applied to the bezel becomes controllable such that touch screen technology may be used in entertainment environments where reliable sealing against liquids is critical to safety.

The prior art discloses two philosophies of design in mounting a CRT inside a video display terminal cabinet, television, or entertainment machine so that it is aligned with a bezel and forms a liquid tight seal with the bezel. Each philosophy of design assumes that the CRT will be housed in an enclosure.

The first philosophy of design was to mount the CRT rigidly to the underside of the front panel, and to place the bezel in rigid mechanical connection in the face frame, with the underside of the bezel pressing tightly against the video display. This approach achieved tight sealing between the CRT and the bezel, but it required that all service be done through the rear panel.

The second approach was to have the front panel mounted to swing out of the way, for quick access to the front of the machine. This method had the great advantage that the machine can be serviced from the front. This approach allowed machines to then be placed side by side in long rows, such as in a casino, without the need for access through a rear panel.

The second approach made it impracticable to mount the CRT on the front panel. The weight of the CRT, the high voltage lines integral to the CRT operation, the need to avoid flexing wires, and the mechanical interference as the CRT swings with the front panel, all precluded mounting of the CRT to a moveable front panel. As a result, the CRT was then mounted in a metal frame which was then attached to a shelf within the cabinet.

The bezel, however, had to be mounted on the front moveable panel. Alignment of the bezel to the CRT when the front panel was closed, became a real problem. A large part of that problem was the need to align and firmly press the bezel against the CRT in order to achieve a liquid tight seal.

Initially, the industry solved the problem by simply placing safety glass or transparent plastic over the front panel to achieve sealing between the public and the video display. In this design, the bezel was under the glass, and the fact that there was poor alignment between the bezel and the CRT was not important because fluids would be deflected by the glass or transparent plastic.

Recently the industry adopted touch sensitive screens. In order for the public to touch the screen, the safety glass had to be eliminated from the design.

Again, the fact that the panel on the front was moveable then created the problem of aligning the video display with the bezel because any panel which swings or lifts out of the way will have many tolerances which lead to misalignment of the panel with respect to the cabinet. Therefore, a bezel mounted in the panel will likewise have misalignment with respect to the cabinet. And when the front panel is closed, the bezel, mounted to the front panel will not exactly close with uniform pressure onto the CRT.

This again presented the safety problem of achieving a liquid tight seal between the bezel and the fixed position video display. The solution in the industry was the labor intensive, cut and try approach of closing the front panel, pushing the CRT monitor from the rear of the panel, then trying to manually adjust the CRT monitor assembly to press, tightly but not too tightly, against the bezel, while bolting the monitor to the cabinet. Then opening and closing the front panel, and noting the gaps between the bezel and the CRT, and again, moving the video display monitor assembly, guessing at the right angle to adjust the CRT, loosening and tightening bolts on the monitor and between the monitor and the cabinet, and adding shims and washers to try to achieve the right fit.

Especially aggravating was that moving the entire monitor assembly would result in alignment at two of the corners of the CRT, but not, simultaneously at all four corners. Use of shims under the rear of the monitor might tilt the monitor to close the gap on the other 2 corners, but the very act of placing the shims would typically change the spacing of the first two corners.

In addition the CRT monitor typically has little clearance on the side for use of wrenches or pliers, thus making it yet more aggravating and difficult to make final adjustments to the tilt and lateral position of each of the four corners of the CRT, with reference to the edges of the bezel.

Again, when the machines are lined up side by side in a long row, there is no way to access the CRT monitor from the rear, and thus access must be through the front panel, yet when the front panel is closed, there is no way to adjust the bezel to make it press firmly, but not too firmly, onto the video display device.

SUMMARY OF THE INVENTION

This invention enables dialing in a predetermined spacing, for each of the four edges of the CRT, to achieve precisely the spacing to be closed. This invention makes possible a simple linear conversion of measured gap at each of the four corners, into the number of rotations of the spacing device to position the four corners in the "z" direction.

FIGS. 1 and 2 show the context of the invention.

FIG. 1 shows a typical video game cabinet 1 with bezel 2 and CRT 3. The bottom edge 5 of the bezel 2 must fit tightly, but not too tightly, against CRT 3.

FIG. 2 shows the video game cabinet 1 with front panel 4 rotated open about hinge 6. When front panel 4 is closed, the bottom edge 5 of the bezel 2 is thereby rotated into position against the CRT monitor. The CRT monitor assembly is placed on shelf 7 of the cabinet 1, and is bolted to the shelf through holes 10. The holes provide the initial position of the base 9.

FIG. 3 shows a base 9, tilt frame 12 mounted for rotation about pivots 14, a CRT 3, a rimband 16 around the CRT, flange ears 18 welded to the rimband 16, adjustment dials 20 mounted for rotation of threaded shafts 22. The threaded shafts have equally spaced threads 23 mounted for rotation in threaded inserts 24 (shown in FIG. 3), or alternatively, lock nuts 26 (shown in FIG. 4). The bezel 2, shown in FIG. 3 with dotted lines, has its bottom edge 5 position set by the closing of the front panel. Wherever that edge is, it is then necessary to close the gaps which will exist between the CRT front surface and the bottom edge. Since the bottom edge of the bezel will typically not be in a perfectly flat plane nor will it be perfectly parallel to the plane of the CRT surface, adjustment of the bezel at each of the four corners, 30, 32, 34, and 36, becomes necessary.

The method of this invention comprises setting and locking the tilt frame 12, and then measuring the size in gaps between the bottom edge of the bezel and the CRT, at each corner 30, 32, 34, 36, and then convert the four gap distances into rotations of the respective dials, and turn those dials to thereby move the four edges, and then tighten the lock nuts 26. Because there is a linear relationship between the lateral motion of the dial 20 against flange ear 18, rotating the dials will move the four corners of the CRT into position to seal against the bezel when the front panel is shut. The first adjustment will typically be the last adjustment, and no further effort or time is needed to complete the task. This represents a major cost savings and quality improvement in this field because this is both a labor saving method and device at the time of manufacturer and also labor saving in the field.

In the field, excited players will often pound on the front of the machine, and the vibration and forces will eventually cause misalignment of the bezel bottom edge from the CRT. With touch screen technology, players are actually pushing against the CRT, and do so with considerable force. The inevitable result is that the CRT becomes misaligned with the bezel. That presents both a safety problem and a maintenance problem. This invention permits the repairman to simply test with a measuring strip, measuring wedge, or calipers, what is the gap at each corner, and then open the front panel, loosen the lock nuts, turn the four dials, tighten the lock nuts, and close the front panel. The immediate result is appropriate, but not too tight, fit between the bezel and the CRT.

It is a further object of the invention to provide a new and improved CRT monitor assembly comprising a base, a tilt frame, means for mounting and precisely adjusting the position of each of the four corners of the CRT, and means for adjusting the tilt of the CRT.

It is a further object of the invention that the CRT mounted to the tilt frame may be easily removed from the base, thus permitting rapid change-out of the CRT whose front surface has become scratched. This is a particularly important need where touch sensitive CRT screens are used in entertainment and gambling environments.

It is a further object of the invention that its tilt frame and four dials permits a wide variety of CRTS and touch screens to be utilized on the same machine. Thus, the CRT may be readily updated, or otherwise changed, without having to change the bezel, the base of the monitor, the electronics in the base.

It is a further object of the invention that controlled, uniformly applied pressure may be maintained all the way around the bottom edge of the bezel.

It is a further object of the invention that mechanical interference and "rocking" will be avoided during adjustment of the CRT to the bezel. For example, in FIG. 3, the direction of the arrows shows that the act of rotating one dial 20 near corner 30 would ordinarily cause a equal and opposite movement at the diagonally opposite corner, causing the entire CRT to rock about an axis through the other two edges. It is precisely this kind of rocking which makes conventional cut and try methods so aggravating and inconclusive. By contrast, dialing in a predetermined amount of correction for each of the four dials, and then tightening the locknuts, achieves simultaneous adjustment, and finishes the job quickly and accurately.

BRIEF DESCRIPTION OF THE DRAWINGS

These and other objects and advantages of the invention will be apparent from reading the following description in conjunction with the drawings.

DESCRIPTION OF THE PREFERRED EMBODIMENT

Figure 1:
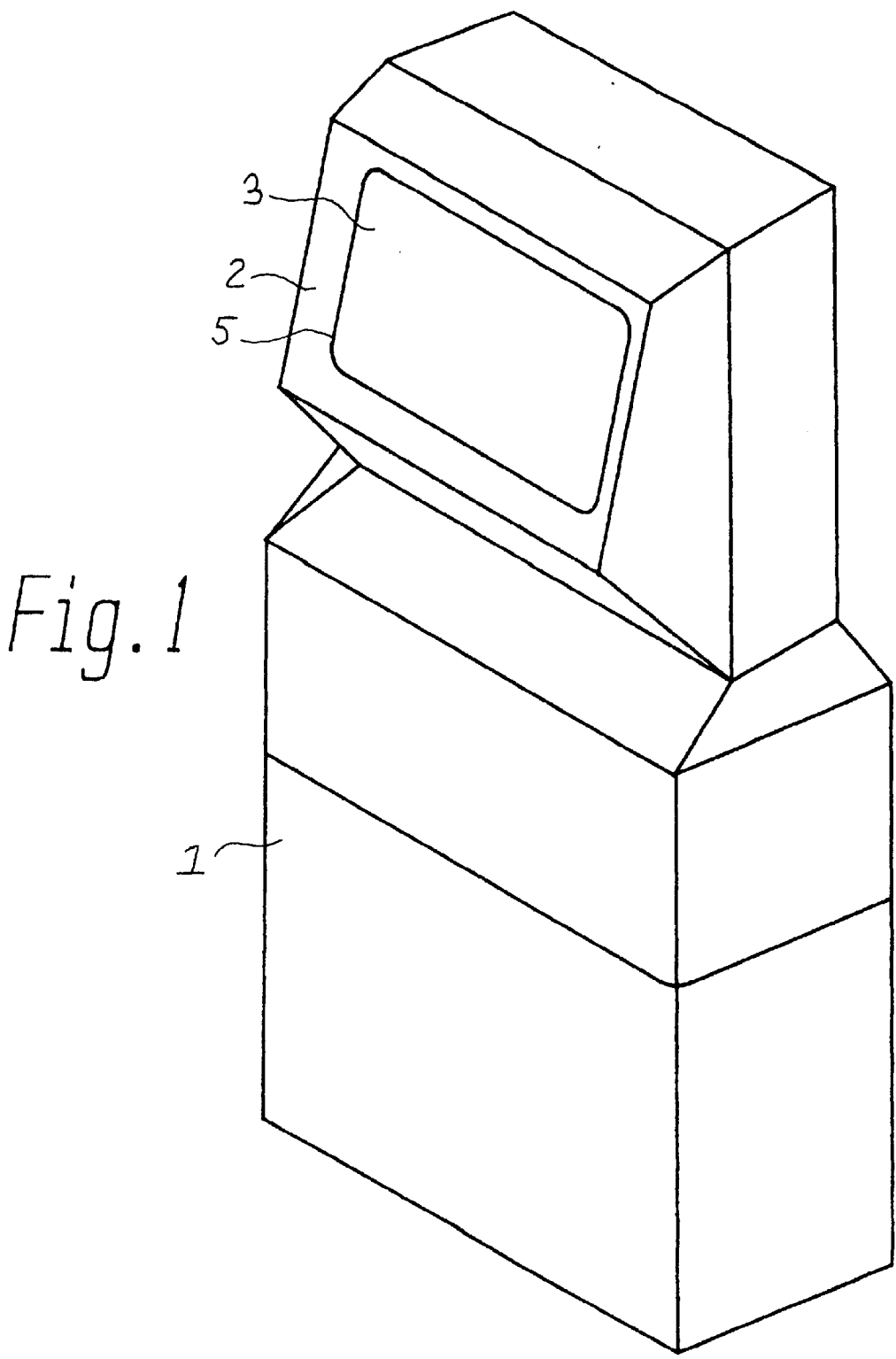
FIG. 1 is a perspective view of a videogame or gaming cabinet.

Referring now to FIGS. 4, 5, 6, and 7, one embodiment of the present invention is shown. It is believed that this embodiment of the invention best achieves the competing goals listed in the summary of the invention and its objects. In particular this embodiment with its tilt frame 12 and four dials 20, permits controlled, uniformly applied pressure all the way around the bottom edge of the bezel no matter that a wide variety of successive CRT/touch screen 3a displays are used over the life of the cabinet 1. Thus, the CRT may be readily updated, or otherwise changed, without having to change the bezel 2, the base 9, or the electronics 30 in the base.

Referring to FIG. 1, a cabinet 1 has a bezel 2 mounted in a front panel 4. When the front panel 4 is closed, the bezel 2 is in touching contact with the front surface of CRT 3. As noted above, where a touch screen technology is desired, the touch screen is usually sandwiched between the front surface of the CRT and the bottom edge of the bezel.

Figure 2:
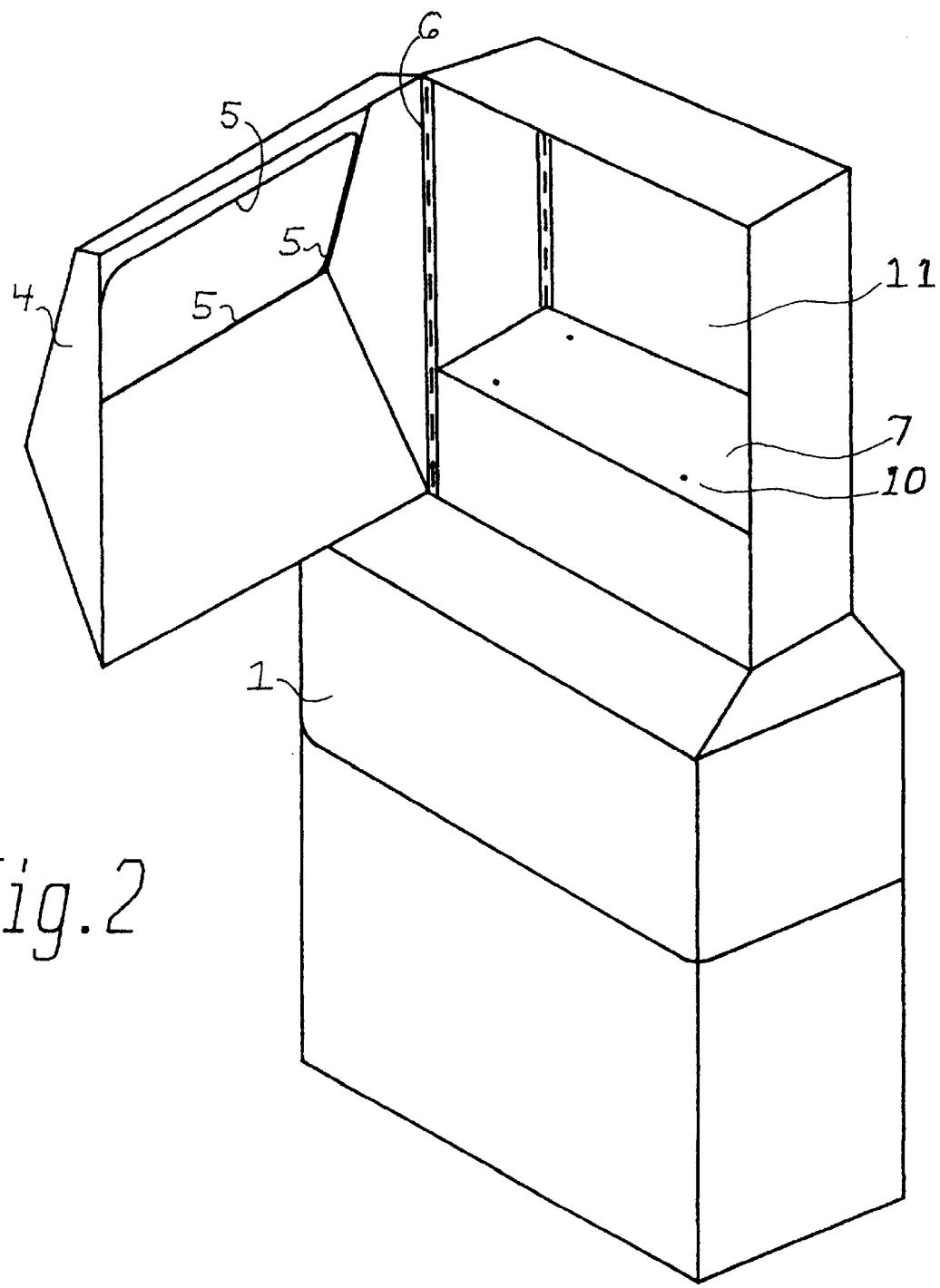
FIG. 2 is a perspective view of the video game cabinet 1 with front panel 4 rotated open about hinge 6.

FIG. 2 shows the video game cabinet 1 with front panel 4 rotated about hinge 6 to an open position. When front panel 4 is closed, bottom edge 5 of the bezel 2 is thereby rotated into position against the CRT monitor. A base 9 is placed on shelf 7 of the cabinet 1, and is bolted to the shelf through holes 10. The holes provide the initial position of the base 9, and from there, a worker sets the tilt and the simultaneous lateral adjustments of the four dials 20. In the factory, the rear door 11 is used to access the bolts to secure the base 9.

Figure 3:
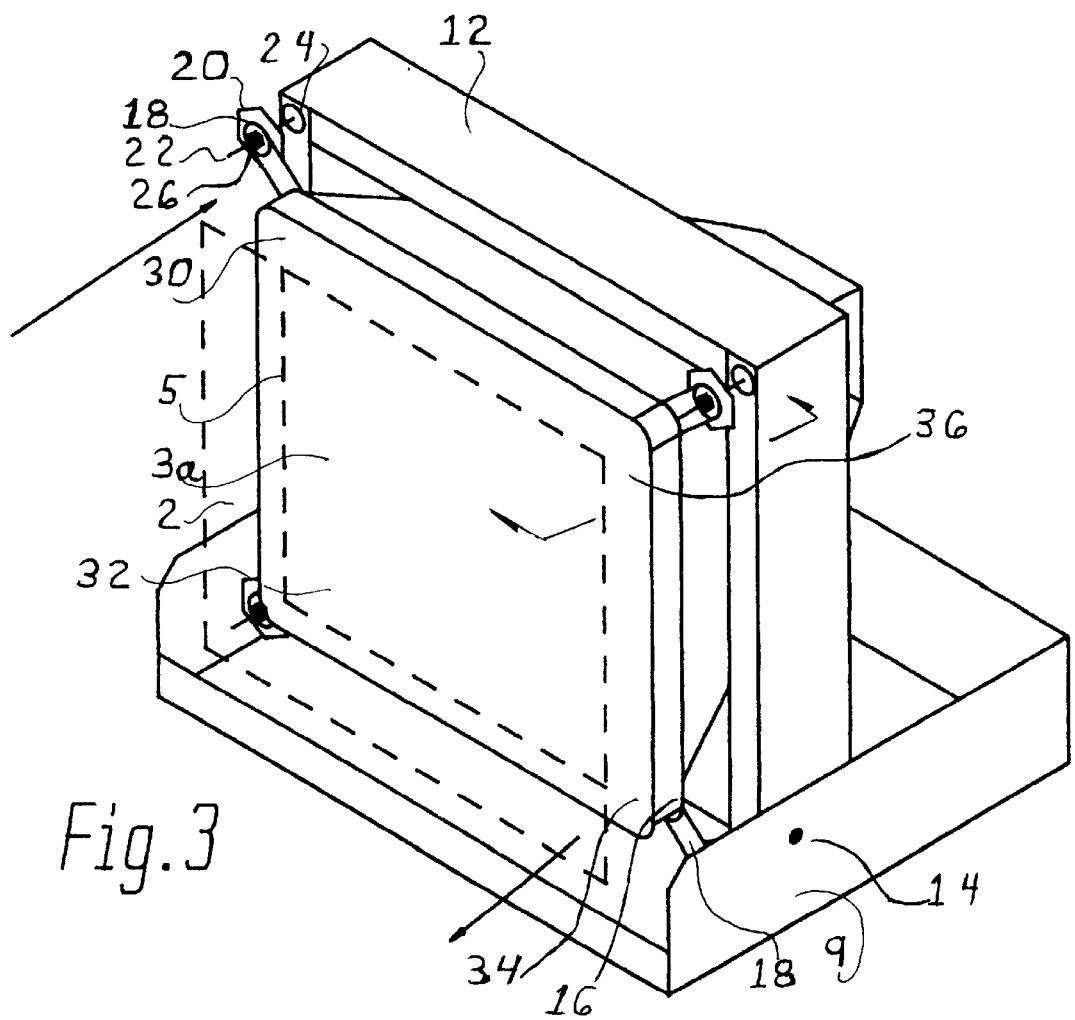
FIG. 3 is a diagrammatic isometric view of the CRT monitor of this invention.

FIG. 3 shows the base 9, tilt frame 12 mounted for rotation about pivot 14, CRT 3, rimband 16, flange ears 18, adjustment dials 20, shafts 22 having equally spaced threads 23 mounted on the flanges 25 of the tilt frame 12. The preferred means of mounting is to have formed or cut in the shafts 22 shoulder 19, so that lock nuts 43 can bias the shoulder 19 against the flange 25, thus forcing the shaft 22 to a perpendicular position with respect to the flange 25. The bezel 2, shown in FIG. 3 with dotted lines, has its bottom edge 5 position set by the closing of the front panel. The bottom edge 5 of the bezel 2 must fit tightly, but not too tightly against the touch screen mounted on CRT 3. Since a variety of CRT's, with or without touch screens, will be placed in the cabinet 1 during the years of use, a variety of spacings or gaps will arise between the bottom edge of the bezel and the CRT front face. Likewise, during the years of use, the opening and closing of the front access panel to retrieve money from the coin box, or to perform maintenance, will result in wear of the hinges and a tendency to shift location of the front panel. While this results in small changes, of the order of 1/16th of an inch (1.6 millimeters), that change is sufficient to prevent a liquid tight seal between the bottom edge of the bezel and the front surface of the CRT.

Figure 4:
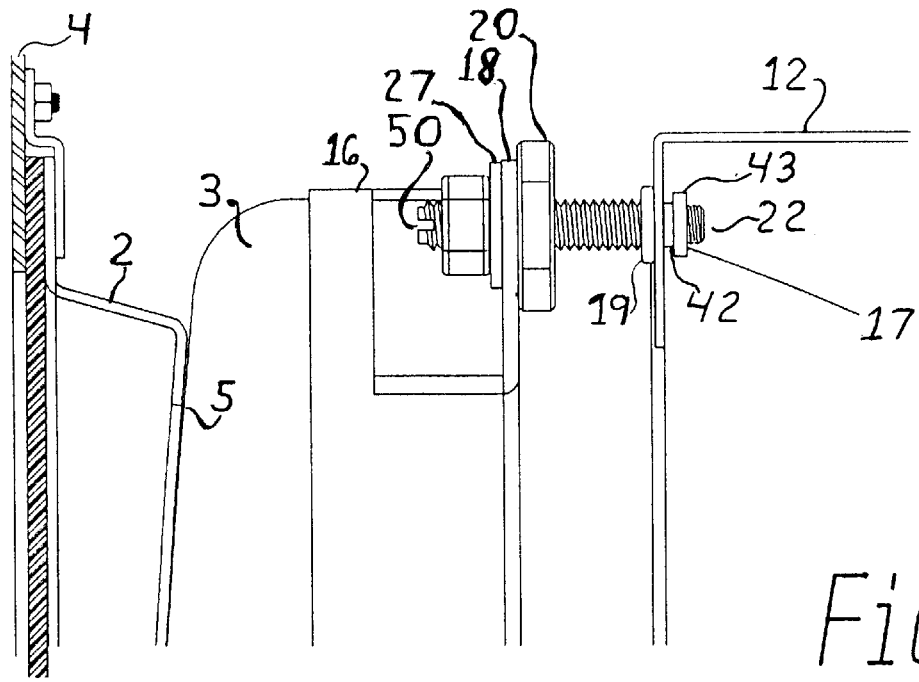
FIG. 4 is a cross sectional view taken through FIG. 3 showing the bezel, CRT and tilt frame with mounting means.
Figure 5:
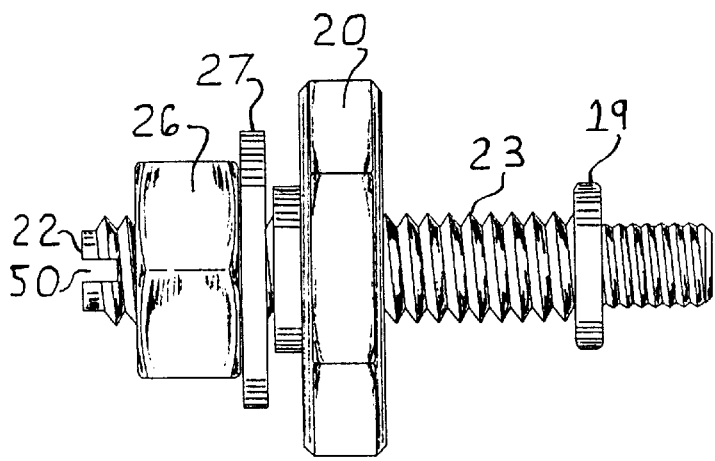
FIG. 5 is a side elevation pictorial view of a variation of the mounting means wherein the shaft has two diameters and a shoulder.

Referring to FIG. 4 and 5, the front panel 4 has bezel 2 with its bottom edge 5 touching the touch screen 3a mounted on the CRT 3. Shaft 22 having threads 23 and a slot 50, has a shoulder 19 and a threaded portion 17 onto which a locknut 17 is secured. An alternative, is the use of a threaded insert 24 in place of, or in addition to, the shoulder 19, lockwasher 42, and locknut 43. Flange ear 18 is spot welded to rim band 16. The rim band is typically mounted on a CRT between the front surface of the CRT and the aquadag, which is the sloping rear portion of the CRT tube. Locking nut 26 and lock washer 27 are secured against flange ear 18 after the correct number of rotations has been dialed into hexagonal dial 20. While the invention prefers a hexagonal dial, the dial could also be knurled or smooth, round or polygonal. The dial 20 must have a threaded inner portion which interfits the threads 23 of the shaft 22.

Figure 6:
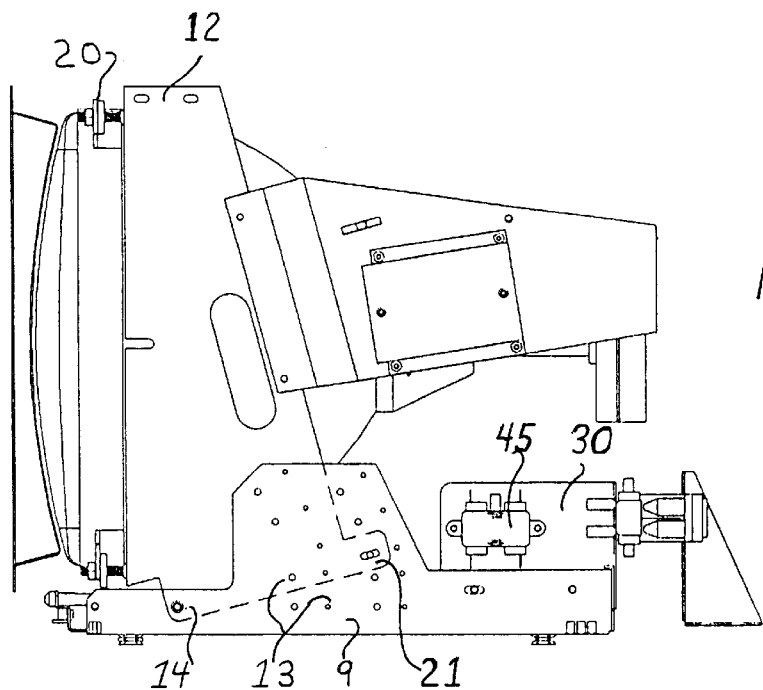
FIG. 6 is a pictorial elevation view of the tilt frame, CRT, base, bezel, and adjustment means.
Figure 7:
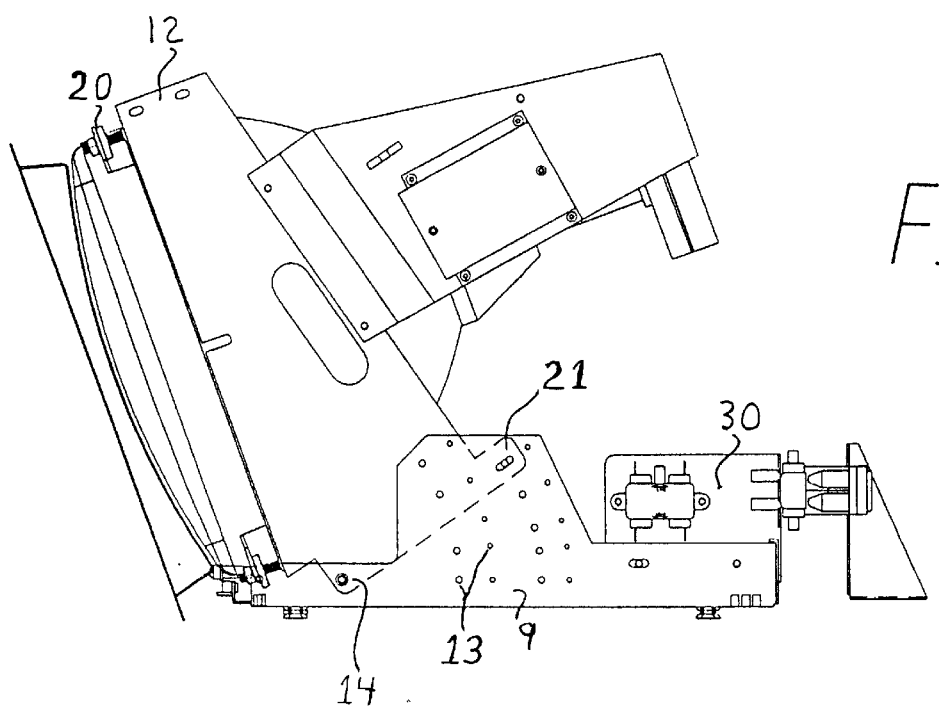
FIG. 7 is a pictorial elevation view showing an alternate position of the tilted frame and CRT.

Referring to FIGS. 6 and 7, tilt frame 12 is mounted for rotation about pivot 14, which pivot comprises matching holes on the tilt frame 12 and the base 9, and a machine screw and nut. The tilt frame 12 is held at a predetermined angle by alignment of holes 21 in the tilt frame with one or more holes 13 in the base. A machine screw and nut passed through a matching pair of holes 21 and 13 secures the tilt frame 12 to a specific angle.

On the base is an electronics unit 30 which provides high voltage and the operating signal to the CRT. Typically, this will include a flyback transformer 45 connected by a line, not shown, to the CRT. An additional safety and reliability advantage of the invention is that, when the CRT/tilting frame is to be removed, the electronics need not be disturbed, other than simply unpluging lines from the base to the CRT.

It is to be understood that the form of the invention herewith shown and described is to be taken as a preferred example of the same and that various changes in shape, size and arrangement of parts may be resorted to, without departing from the spirit of the invention or the scope of the subjoined claims.

I claim:

1. An improved gaming enclosure comprising, in combination:
   a. a cabinet (1),
   b. hinge means (6) mounted on the cabinet (1),
   b. a front panel (4) mounted for rotation about the hinge means (6),
   c. a bezel (2), mounted in an aperture formed in front panel (4), and having bottom edges (5) facing towards the interior of the cabinet (1) when the front panel (4) is closed,
   d. a shelf (10) mounted in the cabinet (1),
   e. a base (9) mounted on the shelf (10) and having at least two pivots (14),
   f. a tilt frame (12) mounted for rotation about pivots (14), and having means to lock the rotation,
   g. four separate threaded spacing means, having adjustment dials (20), mounted near four corners of the tilt frame (12),
   h. a rimband (16) having four corners connected to the four separate threaded spacing means,
   i. a CRT (3) having a display portion mounted within the rimband;
   j. a touch screen (3a) mounted on the display portion of the CRT (3), sandwiched in touching contact with the bottom edges (5) of the bezel (2) when the front panel (4) is rotated to close the cabinet (1), whereby, the pressure of the bottom edges of the bezel presses against the touch sensitive screen (3a) with controlled pressure set by the four separate threaded spacing means such that just sufficient pressure is applied to the touch screen to make a liquid tight seal but not so much pressure as to distort the touch screen.

2. A method for controlling the pressure imposed by a front panel (4) mounted bezel (2) with its bottom edges (5) pressing against a touch sensitive screen (3a), which is sandwiched between the bottom edges (5) of the bezel (2) and a display portion of a CRT (3), and where the CRT (3) has been mounted with reference to a tilt frame (12) by four separate threaded spacing means, having adjustment dials (20), mounted near four corners of the tilt frame (12), comprising the steps:
   a. measuring the spacing to be closed between each edge of the bezel and the touch sensitive screen,
   b. dividing the spacing for each corner by the threads per inch of the threaded spacing means holding the CRT at the corners,
   c. rotating each of the four spacing adjustment dials (20) a number of turns to move each of the corners of the CRT to a predetermined position relative to the bottom edges (5) of the bezel (2),
whereby a controlled predetermined pressure between the bottom edges (5) of the bezel (2) is and the CRT applied to the touch sensitive screen (3a).

\* \* \* \* \*